United States Patent Office 3,410,635
Patented Nov. 12, 1968

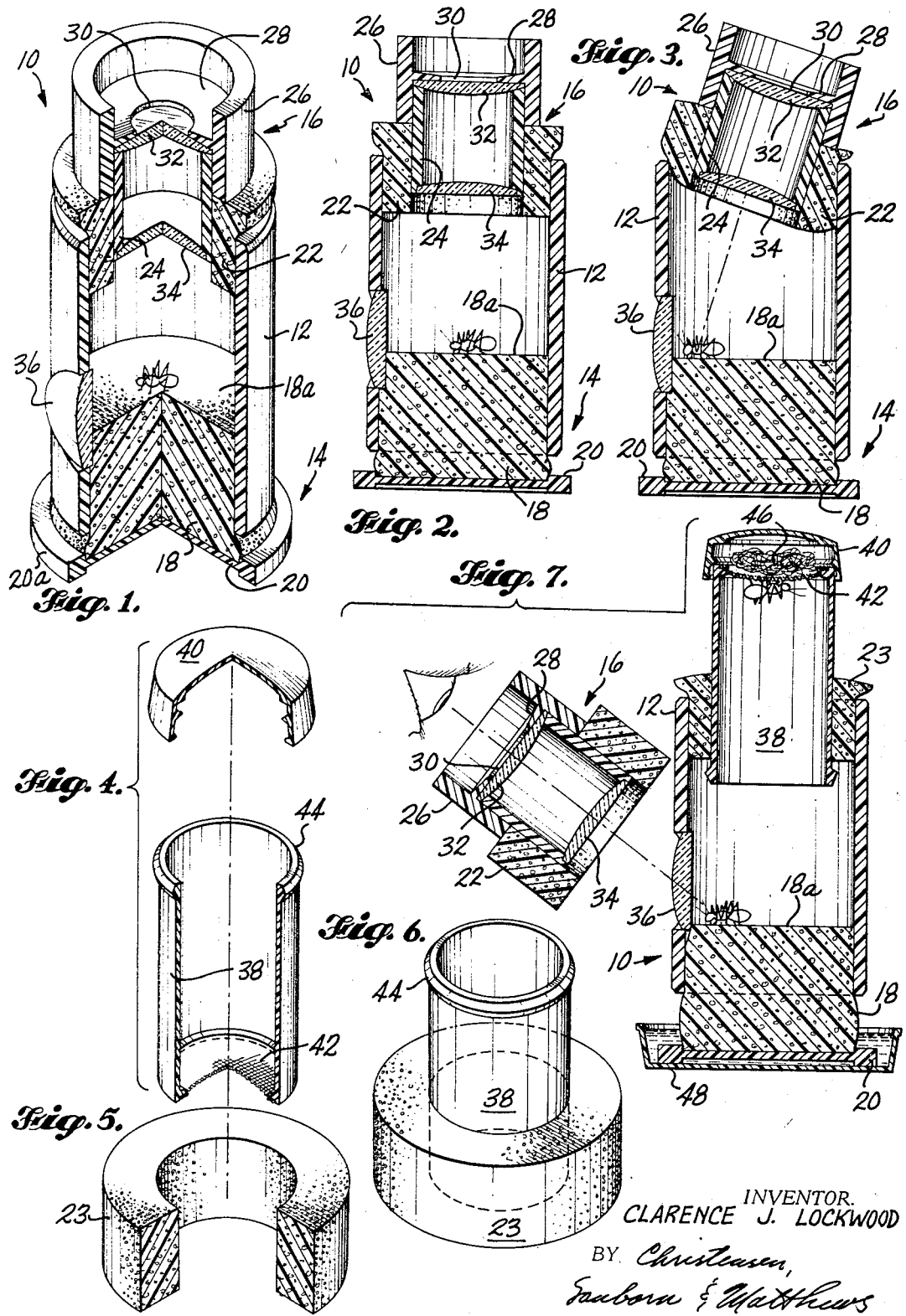

3,410,635
SPECIMEN EXAMINATION CHAMBER
Clarence James Lockwood, 5265 Forest SE.,
Mercer Island, Wash. 98040
Continuation-in-part of application Ser. No. 286,807,
June 10, 1963. This application May 31, 1967, Ser.
No. 642,559
13 Claims. (Cl. 350—239)

ABSTRACT OF THE DISCLOSURE

A specimen examination chamber having transparent side walls and end closures which comprise a lightweight deformable foam substance frictionally engaging the side walls and adapted for positional adjustment with respect thereto. Magnifying lens are mounted in the side walls or end closures for observation of specimens contained within the chamber. The deformable end closure enables relative positioning of the lens and the specimen contained in the chamber. Different embodiments include one wherein the lens means is mounted in the deformable end closure whereby the field of view of the lens can be adjusted to an infinite number of positions for viewing specimens within the chamber. In another embodiment the lens is mounted in the transparent side wall and specimens supported by the deformable end closure may be positioned in the view of the lens. The end closure is preferably of the open cellular foam type permitting ventilation and moisturization of the chamber therethrough. The flexible wall is shaped in some instances to receive a specimen collection chamber in combination with the observation chamber itself for transfer of specimens, and for other purposes.

Cross references

This application is a continuation-in-part of my copending application, Ser. No. 286,807, filed June 10, 1963 and titled "Specimen Display Container," now abandoned. Also mentioned herein is my copending application Ser. No. 497,919, filed Oct. 19, 1965 and titled "Specimen Collecting Apparatus," now U.S. Patent No. 3,330,063.

Background of the invention

This invention relates to specimen examination chambers and more particularly to a specimen examination chamber incorporating a magnification lens enabling magnified visual examination of a specimen captivated in the chamber, and to improvements therein which provide for relative positional adjustability of the specimen and optical viewing means, and other advantageous features. While the invention is herein illustrated and described in terms of particular preferred forms thereof, it will be recognized by those skilled in the art that various modifications and changes may be made therein without departing from the principal features involved.

Various sorts of specimen examination containers have been devised and used in the past, some of which have included lens means for magnified visual observation of captivated specimens. However, most of them have suffered from a lack of versatility and usefulness principally because of the absence of suitable means for adjusting the view of the magnification lens to accommodate movements of a live specimen, or to focus upon different specimens or parts of a specimen without regard to their positions in the container. It is the chief object of this invention to provide means for overcoming this deficiency in prior observation chambers.

There has been a notable gap between the availability of relatively simple preliminary observation chambers and availability of complex expensive microscopes. There has been no satisfactory intermediate examination instrument with intermediate ranges of magnification to be used for educational purposes and in the field for immediate examination of live, active specimens as they are collected. Specimens consequently are often not studied alive because of the difficulty of keeping them within the field of focus of a standard microscope, for example. It is an important object hereof to provide a specimen examination chamber having relatively movable intermediate power magnification means and specimen supporting means for improved observation of live specimens.

A further object is to provide such an examination chamber which is simple and inexpensive enough to be used in elementary schools or on a hobby basis where funds are not available for purposes of expensive and sophisticated microscope type instruments.

In thus providing an instrument of intermediate sophistication and capability, yet vastly improved versatility, the invention provides a convenient tool for use by educators to spark and maintain student interest in biological studies. Observation of magnified movements of live specimens under study stimulates mental inquiry and complements ordinary techniques of teaching regarding miniature living organisms, and leads to rapid comprehension of features and chraacteristics being studied.

A problem characteristic of many prior specimen containers was their lack of ability for maintaining the specimens alive during examination due to suffocation or lack of a means for convenient feeding. The present invention has as another object, therefore, to provide an examination chamber which includes means for convenient feeding of live specimens captivated therein without risk of escape.

Another object is to provide an observation chamber which is adaptable for examination of specimens differing widely in size and behavioral characteristics. It is adapted to provide either dry or wet environment and differing degrees of ventilation, for example.

Another object is to provide an examination chamber which is durable and can be used without great risk of damage by relatively untrained persons.

A related object is to provide a simple, rugged, yet sophisticated examination instrument for use by scientists in the field to observe live specimens as they are collected.

Still another object is to provide a specimen container which can be easily dismantled for cleaning.

Summary of the invention

To achieve the above objects the invention provides a retentive enclosure for examination of specimens confined therein comprising a tubular transparent side wall structure through which specimens may be observed, and end closures engageable with the wall structure to form said enclosure. One of the end closures includes a deformable portion of lightweight foam material adapted to slide frictionally relative to the wall structure. Lens means mounted in either the wall structure or end closure permits magnified visual examination of captivated specimens. The deformable foam portion of the end closure enables relative positional adjustment of the lens and specimens.

In a preferred embodiment the side wall structure comprises a transparent cylinder and includes a magnifying lens mounted therein for viewing transversely of its longitudinal axis. The end closure comprises a cylindrical plug of the foam material forming a specimen supporting stage and permitting longitudinal and relative positional adjustment of the lens and specimen.

In another preferred form the lens means is mounted in one end closure supported on the wall structure by the deformable end closure material, which permits relative longitudinal and angular viewing adjustment of lens means and the specimens with flexing of the foam material. Preferably the tubular wall structure and end closures are cylindrical and the foam material is in the form of a collar supporting a lens holder concentrically therein. The cylindrical form of the parts and flexibility of the end closure enables relative longitudinal and rotative adjustment for viewing of specimens in virtually all positions within the enclosure.

In accordance with another feature of the invention the lens means carried by the end closure is adapated for removal and use in conjunction with lens means mounted in the side wall for additional magnification of the specimen.

Still another feature of the invention is provision of an end closure of foam material in the shape of a collar adapted to receive concentrically therein a specimen collection chamber for transfer of specimens from it to the examination chamber.

While the foam material may be of any of different types of some forms of the invention, it is preferably of the elastomeric, flexible, open-cellular type which is permeable to air and water. It thus provides for ventilation and moisturization of the enclosure, as well as flexibility for both longitudinal and angular adjustment, so that a specimen can be "followed" around the chamber by continuous adjustment of the view of the lens.

The invention further resides in certain details of construction and various cooperative relationships of the parts involved. These and other features, objects and advantages of the invention will be more fully understood from the following detailed description of preferred embodiments of the invention illustrated in the accompanying drawings.

*Brief description of the drawings*

FIGURE 1 is a fragmented isometric view of a specimen examination chamber in accordance with the invention, showing the preferred embodiment in actual size.

FIGURE 2 is a sectional side view of the examination chamber of FIGURE 1.

FIGURE 3 is another sectional side view of the chamber illustrated in FIGURE 1, showing the lens holding means tilted for observation of a live specimen located near the wall of the chamber.

FIGURE 4 is a specimen collection chamber and closure cap therefor for use is combination with the specimen observation chamber.

FIGURE 5 is a ring of elastomeric foam material adapted to support the specimen collection chamber of FIGURE 4 within the examination chamber.

FIGURE 6 is an isometric view showing the specimen collection chamber and foam ring assembled.

FIGURE 7 is a side view of the examinaion chamber with the specimen collection chamber assembled therewith as a feeding station for captivated specimens and showing use of the lens holding means of the chamber in conjunction with the side wall-mounted lens for additional magnification of the specimen.

*Detailed description of preferred embodiments*

The specimen examination chamber 10 illustrated in FIGURE 1 comprises a cylindrical transparent wall structure 12, of rigid durable plastic which resists breakage. The walls are about ⅛ of an inch thick, 2½ inches or more in height and 1¾ inches in diameter. The cylinder 12 is carried by a base unit 14 and supports a lens unit 16.

The base unit 14 includes a plug 18 of foam material, preferably urethafoam a proprietary name applied to an open-cellular, elastomeric polyurethane foam which is permeable to air and most liquids. The plug 18 is cemented to the center portion of a plastic base plate 20 having a flange 20a which provides solid support for the chamber.

The lens unit 16 consists of a lens holder mounted in a collar 22 of the same foam material as used in the base unit. The lens holder consists of an inner sleeve 24, the lower end of which carries an objective lens 34 and is inserted into the foam collar 22 to a depth less than the thickness of the collar so that the latter extends protectively beyond the lens. Thus the lens holder 16 can be removed and set on a surface without damage to the lens. The upper end of sleeve 24 carries eyepiece lens 32 and extends into and is cemented to the inside of a larger outside sleeve 26. The lower end of outer sleeve 26 rests against the top of foam collar 22 and an annular flange 28 recessed in the sleeve from the top forms an eyepiece through the center hole 30 of which specimens in the chamber are viewed.

Transparent cylinder 12 also includes a lens 36 mounted therein about one third of the way up from the bottom for viewing transversely into the chamber. While both side and end-mounted lens need not be provided, versatility of the chamber is increased when they are. Both the base unit 14 and the lens unit 16 are held frictionally in place by engagement of the foam material with the cylinder 12. They can be moved vertically, rotatively or angularly into different positions for the purpose of adjusting the relationship of the lens means and the captivated specimen held on the stage 18a formed by the upper surface of plug 18, regardless of which lens is being used for observation.

For example, in FIGURE 3 the lens unit 16 is shown tilted while still held in place in the top of cylinder 12. Smooth, continuous adjustment to "follow" a specimen about the chamber is permitted by the flexibility and compressibility of the foam material and its ability to slide in the plastic cylinder. In the case of an insect which clings to the upper surface of the chamber, such as to the foam ring 22, the lens unit 16 may be pushed down into the chamber so that the insect can be observed through the side wall lens 36. There is no risk of escape of the specimen during any of such adjustments. Use of foam material which is of the open cellular type provides ventilation through both the bottom and the top of the chamber without necessity for screens or the like.

An active specimen which moves very rapidly into and out of the view and focus of either of the lenses may be held gently between the stage 18a and the lower surface of foam ring 22, once it is properly positioned within the view and focus of the side wall lens 36. With gentle compression upon certain types of specimens in this manner, either the base unit 14 or the lens unit 16 may then be rotated to turn the specimen over into different positions for further examination of detailed features, much as an inanimate specimen might be rotated between the fingers of an observer using a magnifying glass or the like.

Within the scope of the invention both the upper and lower walls of the chamber may be of the foam plug type with provision of only one lens means 36 in the side wall. Alternatively the upper end of the chamber may comprise a foam collar 23 (FIGURE 5) into which a specimen collecting chamber 38 or the like (FIGURES 4–7) may be inserted to introduce specimens into the examination chamber.

The collection chamber 38 and closure cap 40 therefor are disclosed in my copending application Ser. No. 497,919 mentioned above, disclosing specimen collecting apparatus in which specimens are collected directly into the collection chamber 38. The chamber 38 consists of a cylindrical tube of plastic or the like which is preferable transparent and has a screen 42 mounted in the lower end thereof. The other end has a flange 44 adapted to receive the snap-on type closure cap 40 or other suitable closure means. Specimens in the collection chamber are easily transferred to the examination chamber 10 described herein by inserting the collection chamber 38 into the foam ring 23 as shown in FIGURE 6, inverting it and inserting it into the upper end of the observation chamber as shown in FIGURE 7.

The collection chamber 38 becomes a feeding station by use of closure cap 40 on the screen 42 of collection chamber 38 to hold a wad of cotton or other material 46 thereon soaked with a nutrient such as sugar and water. The insect specimen feeds by inserting its proboscis through the screen as illustrated. Alternatively, a nutrient fluid may be introduced into the chamber by injection through the foam material by means of a hypodermic syringe, for example.

Since the foam material is permeable not only to air, but to most fluids as well, it can be used for feeding or providing a moist environment for certain specimens in the manner shown in FIGURE 7. The base unit 14 is set in a pan 48 of water which may contain a dissolved nutrient or the like, which is drawn continuously to the upper surface 18a of the plug 18.

The lens unit 16 may be used in combination with the side wall lens 36 as shown in FIGURE 7 for additional magnification of the specimen so that more minute features and movements may be observed. The side lens 36 has a magnification power of up to 8×, its focal length ranging from ¾ of an inch to 1½ inches with the largest magnification power being at the largest focal length corresponding with the opposite side of the chamber. The combination of lens 32 and 34 in the lens unit 16 provides a magnification power of 8× also. When lens unit 16 is used in combination with lens 36 the magnification power is increased to about 20×.

Thus the invention provides an extremely versatile examination chamber permitting observation of specimens of various sizes and characteristics of behavior. It is of relatively inexpensive construction, and provides intermediate magnification power for in-field use or for student or hobby use. Other advantages will be recognized by those skilled in the art.

What is claimed is:

1. A retentive enclosure for examination of specimens captivated therein comprising a tubular transparent side wall structure through which specimens may be observed and end closures engageable with said wall structure to form said enclosure, lens means supported by one of said wall structure and end closure means for magnified visual observation of said specimens, one of said end closures including a portion of lightweight foam material which is deformable for slidable and tiltable adjustment thereof relative to said wall structure to to enable relative positional adjustment of said lens means and specimens for magnified observation of the latter at substantially all positions in said enclosure.

2. The enclosure defined in claim 1 wherein said wall structure is cylindrical and includes a magnifying lens mounted therein for interior viewing transversely of its longitudinal axis, and wherein said one end closure comprises a cylindrical plug of said foam material forming a specimen supporting stage and adjustable slidably and deformably within said cylinder for positioning specimens in the view of said lens.

3. The enclosure defined in claim 1 wherein said lens means is mounted in said one end closure supported by said deformable portion for viewing longitudinally of said tubular wall structure, said deformable portion enabling tilting of said lens means for viewing in directions other than longitudinally of said structure.

4. The enclosure defined in claim 3 wherein said wall structure and end closures are cylindrical, said one end closure comprises an annular collar of said deformable foam material, and said lens means comprises a lens holder mounted concentrically within said collar and including an objective lens and an eyepiece lens.

5. The enclosure defined in claim 4 wherein said lens holder comprises a first sleeve member having one end extending into said collar and supporting said objective lens thereon at a position inside said collar whereby the collar extends protectively beyond the objective lens, the other end of said first sleeve member supporting said eyepiece lens, a second sleeve member of larger diameter than the first and into which the first extends; said second sleeve member having one end abutting said collar and the other extending beyond the end of the first sleeve member to form a protective structure for said eyepiece lens.

6. The enclosure defined in claim 3 wherein the other end closure comprises a plug of lightweight foam material adapted to fit frictionally engaged within the end of said tubular wall structure to form a specimen stage slidable within said structure.

7. The enclosure defined in claim 6 wherein said wall structure and end closures are cylindrical.

8. The enclosure defined in claim 7 wherein said other end closure includes a rigid base plate secured to said foam plug to support said enclosure.

9. The enclosure defined in claim 8 further including an additional lens means mounted in said tubular wall structure for viewing specimens therein, said first-mentioned end closure being removable and the lens means mounted therein being cooperable with said additional lens means for multiplied magnification of specimens viewed through both simultaneously.

10. The enclosure defined in claim 2 wherein said foam material is permeable to fluids, whereby fluid is drawn to the surface of said stage within said enclosure when the lower portion of said plug is placed in said fluid.

11. The enclosure defined in claim 2 wherein said other end closure comprises an annular collar of said deformable foam material having a center opening therein adapted to receive additional closure means.

12. The enclosure defined in claim 11 including a specimen collection chamber adapted to be received in said opening for transfer of specimens to said enclosure through said other end closure.

13. The enclosure defined in claim 1 wherein said foam material is open-cellular elastomeric foam permeable to air for ventilation of said enclosure.

References Cited

UNITED STATES PATENTS

| | | | |
|---|---|---|---|
| 42,843 | 5/1864 | Ellis | 350—239 |
| 56,178 | 7/1866 | Chase | 350—239 |
| 271,838 | 2/1883 | Gould | 350—9 |
| 2,961,108 | 11/1960 | Johnson | 350—243 |
| 3,029,694 | 4/1962 | Dantzic | 350—239 |
| 3,119,185 | 1/1964 | Gray | 350—245 X |
| 3,121,961 | 2/1964 | Engle et al. | 350—86 |
| 3,213,539 | 10/1965 | Burris | 350—10 X |

FOREIGN PATENTS

| | | |
|---|---|---|
| 1,249,713 | 11/1960 | France. |
| 801 | 3/1860 | Great Britain. |

DAVID SCHONBERG, *Primary Examiner.*

T. H. KUSMER, *Assistant Examiner.*